(12) United States Patent
Rondeau et al.

(10) Patent No.: US 9,637,068 B2
(45) Date of Patent: May 2, 2017

(54) COMPONENT FOR A MOTOR VEHICLE AND ASSOCIATED MOTOR VEHICLE

(71) Applicant: Faurecia Automotive Industrie, Nanterre (FR)

(72) Inventors: Jean-François Rondeau, Carignan (FR); Philippe-Jean Marcq, Mouzon (FR)

(73) Assignee: Faurecia Automotive Industrie, Nanterre (FR)

( * ) Notice: Subject to any disclaimer, the term of this patent is extended or adjusted under 35 U.S.C. 154(b) by 337 days.

(21) Appl. No.: 14/374,095

(22) PCT Filed: Jan. 21, 2013

(86) PCT No.: PCT/EP2013/051055
§ 371 (c)(1),
(2) Date: Jul. 23, 2014

(87) PCT Pub. No.: WO2013/110573
PCT Pub. Date: Aug. 1, 2013

(65) Prior Publication Data
US 2014/0342138 A1  Nov. 20, 2014

(30) Foreign Application Priority Data

Jan. 26, 2012 (FR) ...................................... 12 50748

(51) Int. Cl.
*B60R 13/08* (2006.01)
*B32B 5/08* (2006.01)
(Continued)

(52) U.S. Cl.
CPC .......... *B60R 13/0838* (2013.01); *B32B 3/263* (2013.01); *B32B 3/28* (2013.01);
(Continued)

(58) Field of Classification Search
None
See application file for complete search history.

(56) References Cited

U.S. PATENT DOCUMENTS 5,567,922 A * 10/1996 Schmuck ................ B60R 13/08
181/284
5,981,046 A * 11/1999 Masui ................... B29C 44/025
428/213
(Continued)

FOREIGN PATENT DOCUMENTS

DE        3301682 A1    7/1984
DE   102004053751 A1    5/2006
(Continued)

OTHER PUBLICATIONS

International Search Report for application No. PCT/EP2013/051055, dated Mar. 4, 2013, 3 pages.

Primary Examiner — David Sample
Assistant Examiner — Donald M Flores, Jr.
(74) Attorney, Agent, or Firm — Reising Ethington P.C.

(57) ABSTRACT

Component for a motor vehicle and associated motor vehicle. The component according to the invention has a first support layer (20) and a second support layer (22), partially applied on the first layer (20). The second layer (22) includes at least one first region (24A, 24B) applied on the first layer (20) and at least one second region (26A, 26B) positioned across from and separated from the first layer (20), the second region (26A, 26B) together with the first layer (20) delimiting an intermediated space (34A, 34B). The second region (26A, 26B) has a density lower than the density of the first region (24A, 24B). The second layer (22) comprises at least one third region (28A) applied on the first layer (20), the third region (28A) having a density lower than the density of the first region (24A, 24B).

15 Claims, 5 Drawing Sheets

(51) Int. Cl.
*B32B 7/02* (2006.01)
*B32B 5/14* (2006.01)
*B32B 3/26* (2006.01)
*B32B 3/28* (2006.01)

(52) U.S. Cl.
CPC .......... *B32B 5/08* (2013.01); *B32B 5/142* (2013.01); *B32B 7/02* (2013.01); *B32B 2250/02* (2013.01); *B32B 2262/02* (2013.01); *B32B 2262/10* (2013.01); *B32B 2262/105* (2013.01); *B32B 2307/102* (2013.01); *B32B 2307/72* (2013.01); *B32B 2605/00* (2013.01); *B32B 2605/08* (2013.01); *Y10T 428/2495* (2015.01); *Y10T 428/24992* (2015.01)

(56) References Cited

U.S. PATENT DOCUMENTS

| | | | |
|---|---|---|---|
| 7,320,739 B2 * | 1/2008 | Thompson, Jr. | B32B 5/02 156/196 |
| 2008/0001431 A1 * | 1/2008 | Thompson | B32B 5/26 296/187.01 |

FOREIGN PATENT DOCUMENTS

| | | |
|---|---|---|
| EP | 0511157 A1 | 10/1992 |
| EP | 1251001 A1 | 10/2002 |
| FR | 2979308 A1 | 3/2013 |
| WO | WO 97/48576 A1 | 12/1997 |

* cited by examiner

COMPONENT FOR A MOTOR VEHICLE AND ASSOCIATED MOTOR VEHICLE

TECHNICAL FIELD

The present invention relates to a component for a motor vehicle, comprising:
- a first support layer made from a composite material;
- a second layer made from an open porous material, the second layer being partially applied on the first layer, the second layer including at least one first region applied on the first layer and at least one second region positioned across from and separated from the first layer, the second region together with the first layer delimiting an intermediate space at least partially filled with gas.

This component is for example intended to form a protective hood, a shelf or a false floor having soundproofing properties.

BACKGROUND

Advantageously, the component of the aforementioned type is designed to be used as a lower motor vehicle engine hood, commonly called "under-engine fairing".

The purpose of such a closing component is to downwardly close off the bottom part of the engine cradle to isolate the engine from the outside. It also serves to protect the engine from any impacts, and to avoid projections of gravel, water and mud toward the engine, during operation of the vehicle. This component also prevents flows of oil or water from the engine from falling on the ground. This part serves to improve the aerodynamics of the vehicle (flat bottom) and optimize the various air intakes (scoops).

In a known manner, the structural components are generally manufactured in a single piece by injection, for example from polypropylene. A component of the aforementioned type is for example described in FR 2,853,297.

Such an assembly is robust, but can still be improved acoustically. In fact, in light of the greenhouse gas reduction constraints on vehicles, the current engine assemblies are generally more noisy than in the past, and require better soundproofing, for example using encapsulating techniques.

To offset this problem, it is known to position a sound-absorbing layer on the under-engine fairing, which nevertheless has the drawback of increasing the weight of the structure, and therefore the fuel consumption of the vehicle.

Within the meaning of the present invention, a soundproofing assembly provides acoustic "insulation" when it prevents the entry of medium and high frequency acoustic waves into the soundproofed space, essentially by reflecting waves toward the noise sources or the outside of the soundproofed space.

A soundproofing assembly operates by "sound absorption" (in the medium and high frequency field) when the energy from the acoustic waves dissipates in an absorptive material.

A high-performance soundproofing assembly must work both by providing good insulation and absorption.

SUMMARY

One aim of the invention is to obtain a motor vehicle component, in particular an under-engine fairing that has suitable structural properties, a reduced weight, and effective soundproofing.

To that end, the invention relates to a component of the aforementioned type, characterized in that the second region has a density lower than the density of the first region, the second layer comprising at least one third region applied on the first layer, the third region having a density lower than the density of the first region.

The component according to the invention may comprise one or more of the following features, considered alone or according to any technically possible combinations:
- the density of the third region is lower than the density of the second region;
- the density of the second region is comprised between 250 kg/m$^3$ and 300 kg/m$^3$, the density of the third region being comprised between 200 kg/m$^3$ and 250 kg/m$^3$;
- it includes at least one resistive porous layer positioned on one of the first layer and the second layer, the air flow resistance from the resistive porous layer being comprised between 200 N·m$^{-3}$·s and 2000 N·m$^{-3}$·s;
- the air flow resistance of the resistive porous layer across from the third region is greater than the air flow resistance of the third region;
- the difference between the air flow resistance of the resistive porous layer and the air flow resistance of the third region is greater than 250 N·m$^{-3}$·s;
- the second region extends substantially parallel to a zone of the first layer, the second region being connected to the first region by an intermediate region protruding between the first region and the second region;
- the first region is formed in a single piece from a composite material including polymer fibers and ceramic fibers, in particular silica fibers;
- the second layer is formed in a single piece from a composite material that is locally compressed, the composite material advantageously containing polymer fibers and ceramic fibers, in particular silica fibers;
- the surface density of the first layer is comprised between 500 g/m$^2$ and 1500 g/m$^2$;
- the surface density of the second layer is comprised between 500 g/m$^2$ and 1500 g/m$^2$;
- the maximum thickness of the intermediate space, between the second region and the first layer, is greater than the thickness of the third region;
- it includes a protective sealed layer positioned across from the first layer opposite the second layer.

The invention also relates to a motor vehicle, characterized in that it includes a component as described above, the component advantageously being positioned below the engine of the vehicle to form a protective fairing.

The invention also relates to a preferred method for manufacturing a component as defined above, characterized in that it includes the following steps:
- providing a composite material designed to form the first support layer;
- providing a composite open porous material designed to form the second layer;
- forming, on the second layer, at least one first region, at least one second region with a density lower than the density of the first region, and at least one third region with a density lower than the density of the first region;
- applying the first region on the first layer;
- positioning the second region across from and separated from the first layer to delimit, with the first layer, an intermediate space at least partially filled with gas or a porous material;
- applying the third region on the first layer.

The method according to the invention may comprise the following feature:

positioning the open porous material, and the composite material, between two parts of a mold;

inserting a core between the open porous material and the composite material;

partially closing the mold, the core being inserted between the composite material and the open porous material to form the second region designed to be positioned separated from the first layer;

opening the mold and removing the core;

completely closing the mold to apply the first region and the third region against the first layer, the second region being positioned across from and separated from the first layer.

BRIEF DESCRIPTION OF THE DRAWINGS

The invention will be better understood upon reading the following description, provided solely as an example and done in reference to the appended drawings, in which.

DETAILED DESCRIPTION OF THE ILLUSTRATED EMBODIMENT(S)

In the rest of this document, the orientations are the typical orientations of a motor vehicle. Thus, the terms "front", "rear", "left", "right", "upper", "lower", "outer", "inner" must generally be understood relative to the normal direction of movement of the vehicle and relative to an occupant of the motor vehicle.

Figure 1:
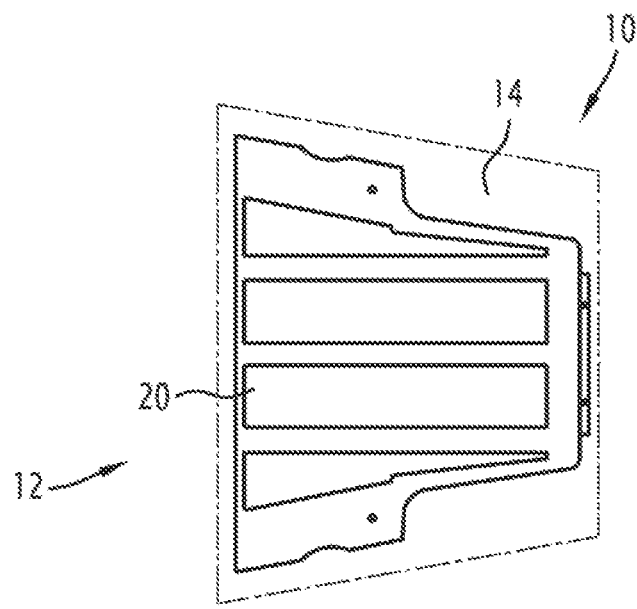
FIG. 1 is a bottom view of a first motor vehicle component according to the invention.
Figure 7:
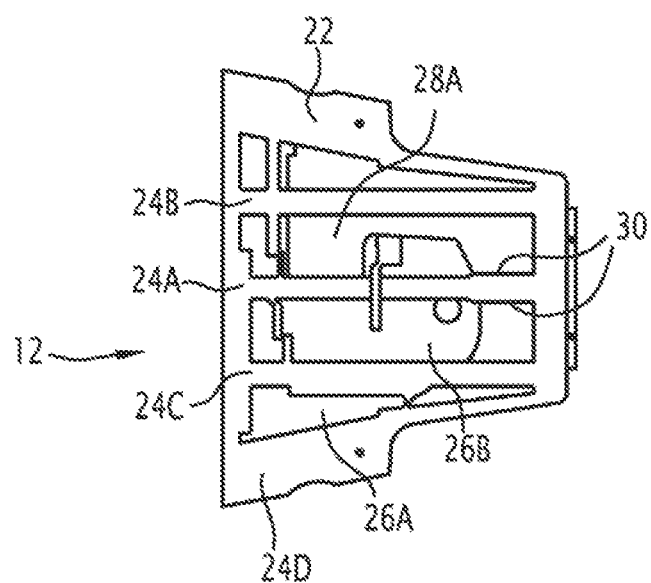
FIG. 7 is a top view of the first component shown in FIG. 1.
Figure 2:
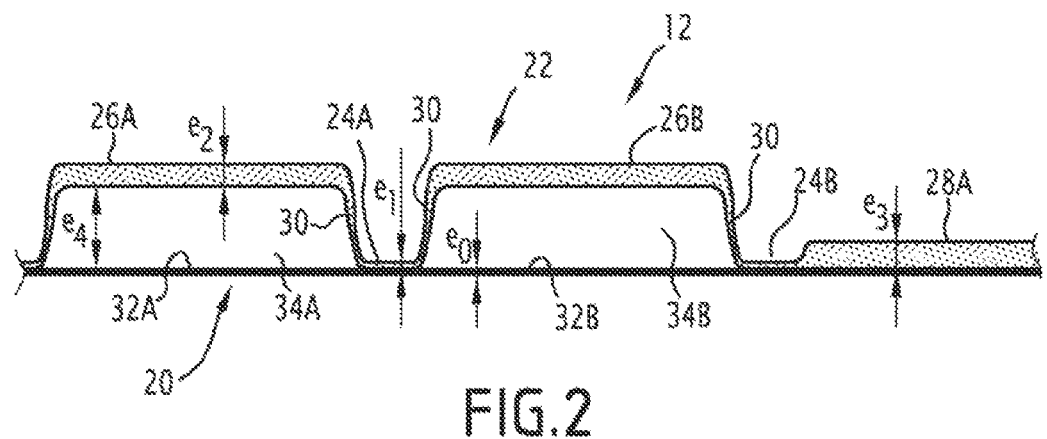
FIG. 2 is a partial cross-sectional view along a transverse plane of the component of FIG. 1.

FIGS. 1, 2 and 7 partially illustrate a first motor vehicle 10 provided with a component 12 according to the invention.

In the specific example illustrated in FIG. 1, the component 12 forms a lower motor vehicle engine fairing, or "under-engine fairing". It is positioned below the engine compartment 14 of the vehicle 10 diagrammatically shown in FIG. 1.

More generally, the component 12 forms a structuring and soundproofing wall of the vehicle, such as a false floor, or another sub-hood. Alternatively, the component 12 forms an inner component of the vehicle, such as a shelf forming a rear concealing device concealing the trunk of the vehicle.

In the specific example illustrated in FIG. 1, the component 12 has a substantially trapezoidal or triangular shape converging toward the front of the motor vehicle.

As illustrated by FIG. 2, the component 12 has a first support layer 20 and a second support layer 22, partially applied on the first layer 20.

The second layer 22 thus delimits at least one first compressed region 24A to 24D, applied on the first layer 20 to form a structuring zone, at least one second region 26A, 26B that is compressed little or not at all, forming an acoustic membrane, and at least one third region 28A that is compressed little or not at all, applied on the first layer 20.

It further defines at least one intermediate region 30 connecting each first region 24A to 24D to a second region 26A, 26B.

The first layer 20 is advantageously formed in a single piece. It is in particular formed with a base of a composite material obtained from a compressed and heated felt. The felt for example includes polymer fibers, in particular thermofusible polymer, which may be polyolefin fibers, such as polypropylene fibers.

The polymer fibers are at least partially melted during heating to form a matrix in which the ceramic fibers are dispersed.

In particular, the felt includes a mixture of polymer fibers as defined above, and ceramic fibers, in particular glass fibers.

The weight percentage of polymer fibers is for example comprised between 40% and 70%, and the weight percentage of ceramic fibers is for example comprised between 40% and 70%. Such a material is commonly referred to as "Sommold".

Advantageously, aside from the matrix formed from the polymer fibers of the ceramic fibers, the composite material includes other fibers, such as natural fibers, or regenerated natural fibers.

In this example, the mean thickness e0 of the first layer 20 is smaller than the mean thickness of the second layer 22. The mean thickness e0 is in any case smaller than the mean thickness e2 of each second region 26A, 26B and the mean thickness e3 of each third region 28A.

The mean thickness e0 of the first layer 20 is in particular comprised between 0.2 mm and 2 mm, advantageously comprised between 0.8 mm and 1.4 mm. It is advantageously constant.

The first layer 20 is compressed. Thus, its surface density is comprised between 500 g/m$^2$ and 1500 g/m$^2$, and is advantageously comprised between 700 g/m$^2$ and 800 g/m$^2$.

In this example, the first layer 20 is airtight. It has an air flow resistance too high to be measured using the method described in the Thesis "Measurement of parameters characterizing a porous medium. Experimental study of the acoustic behavior of low-frequency foams". Michel HENRY, defended Oct. 3, 1997 University of Mans.

Alternatively, in particular for shelf applications, the first layer 20 is porous. It then has a weight percentage of polymer comprised between 40% and 50%. The air flow resistance of the first layer is then comprised between 800 N·m$^{-3}$ s and 2000 N·m$^{-3}$ s. In this case, the structure is reversed, the first layer 20 being oriented toward the top of the passenger compartment.

The first layer 20 as well as the regions 24A to 24D are rigid in order to have a structuring nature. The component 12 thus has a residual bend under its own weight of less than 4 mm measured by three-point bending (the three points are made up of the three ends of the component approximately forming a triangle).

The second layer 22 is also formed in a single piece. It is advantageously formed with a base of the same composite material as that forming the first layer 20 or a similar material, in particular obtained from a felt with a base of polymer fibers and ceramic fibers, such as "Sommold".

The material forming the second layer is porous with open pores.

The second layer 22 has a surface density comprised between 500 g/m² and 1500 g/m² and advantageously comprised between 700 g/m² and 800 g/m², or between 1000 g/m² and 1200 g/m².

In the example shown in FIGS. 2 and 7, at least one first compressed region 24A, 24B, 24C of the second layer 22 extends through the component 12 and at least one first compressed region 24D of the second layer 22 extends along the periphery of the component 12.

In the example illustrated in FIGS. 2 and 7, the second layer 22 includes a plurality of first regions 24A, 24B, 24C extending through the component 12.

Each first region 24A to 24D is applied on the first layer 20. Each first region 24A to 24D is compressed to have a density d1 greater than the density d2 of each second region 26A, 26B, and a density d1 greater than the density d3 of the third region 28.

The mean thickness e1 of each first region 24A to 24D is smaller than the mean thickness e0 of each second region 26A, 26B and the mean thickness e3 of each third region 28A. The mean thickness e1 is in particular comprised between 0.2 mm and 2 mm. It is substantially constant.

Each first region 24A to 24D applied on the first layer 20 has a high rigidity, as specified above.

Each second region 26A, 26B advantageously extends between two first regions 24A, 24B. Each second region 26A, 26B is situated across from and completely separated from the first support layer 20.

In the example illustrated in FIG. 2, each second region 26A, 26B extends parallel to a zone 32A, 32B opposite the first layer 20.

In reference to FIG. 2, the mean thickness e2 of each second region 26A, 26B is greater than the mean thickness e1 of each first region 24A, 24B and is advantageously smaller than the mean thickness e3 of each third region 28A. The mean thickness e2 is in particular and advantageously comprised between 2 mm and 6 mm.

The density d2 of each second region 26A, 26B is lower than the density d1 of each first region 24A and is advantageously greater than the density d3 of each second region 28A. The density d2 is for example comprised between 250 kg/m³ and 300 kg/m³.

The air flow resistance of each second region 26A, 26B is less than 2000 N·m⁻³·s.

Each second region 26A, 26B and the opposite first layer 20 define a hollow intermediate space 34A, 34B advantageously forming an air gap. Thus, the assembly formed by the zone 32A, 32B of the first layer 20, the intermediate space 34A and the second region 26A form a porous open acoustic membrane having absorptive properties.

The maximum thickness e4 of the intermediate space 34A, 34B, considered perpendicular to a directing surface of each second region 26A, 26B, is greater than the mean thickness e2 of the second region 26A, 26B, advantageously at least two times greater than the thickness e2.

Advantageously, the intermediate space 34A, 34B is filled with air and lacks any solid.

The intermediate regions 30 connect each first region 24A, 24B to a second region 26A, 26B. They protrude separated from the first layer 20 from each first region 24A, 24B toward the second region 26A, 26B.

Each third region 28A is pressed-against the first layer 20.

Each third region 28A is compressed little or not at all. It thus has a mean density d3 lower than the mean density d1 of each first region 24A, 24B and below the mean density d2 of each second region 26A, 26B. The mean density d3 of each third region 28A is for example comprised between 200 kg/m³ and 250 kg/m³.

The air flow resistance of each third region 28A is low. It is for example below the air flow resistance of each second region 26A, 26B, and is in particular less than 1500 N·m⁻³·s.

The mean thickness e3 of each third region 28A is greater than the mean thickness e2 of each second region 26A, 26B and is greater than the mean thickness e1 of each first region 24A to 24D.

The mean thickness e3 of each third region 28A is for example greater than 5 mm, and is in particular comprised between 6 mm and 10 mm.

Each third region 28A partially protrude separated away from the first layer 20, from the first region 24A, 24B. It has a thickness e3 smaller than the thickness e4 of the intermediate space 34A, 34B.

Thus, in the case of a lower engine fairing, each third region 28A is situated across from elements of the engine for which it is not possible to provide a hollow intermediate space 34A, 34B as across from the second regions 26A, 26B.

During operation, when the component 12 is mounted on the motor vehicle 10, the first regions 24A to 24D, applied on the first layer 20, provide structural rigidity for the component 12 with the first layer 20.

As seen above, the second regions 26A, 26B of the second layer 22 form, with the opposite zones 32A, 32B of the first layer 20 and with the intermediate spaces 34A, 34B, porous acoustic absorption membranes that absorb the noise in the low and medium frequencies, for example in a frequency range comprised between 100 Hz and 2000 Hz.

The third regions 28A are also partially absorptive. They cooperate with the zones of the first layer 20 on which they are applied to ensure sound absorption, in particular in the low and medium frequency range.

Figure 3:
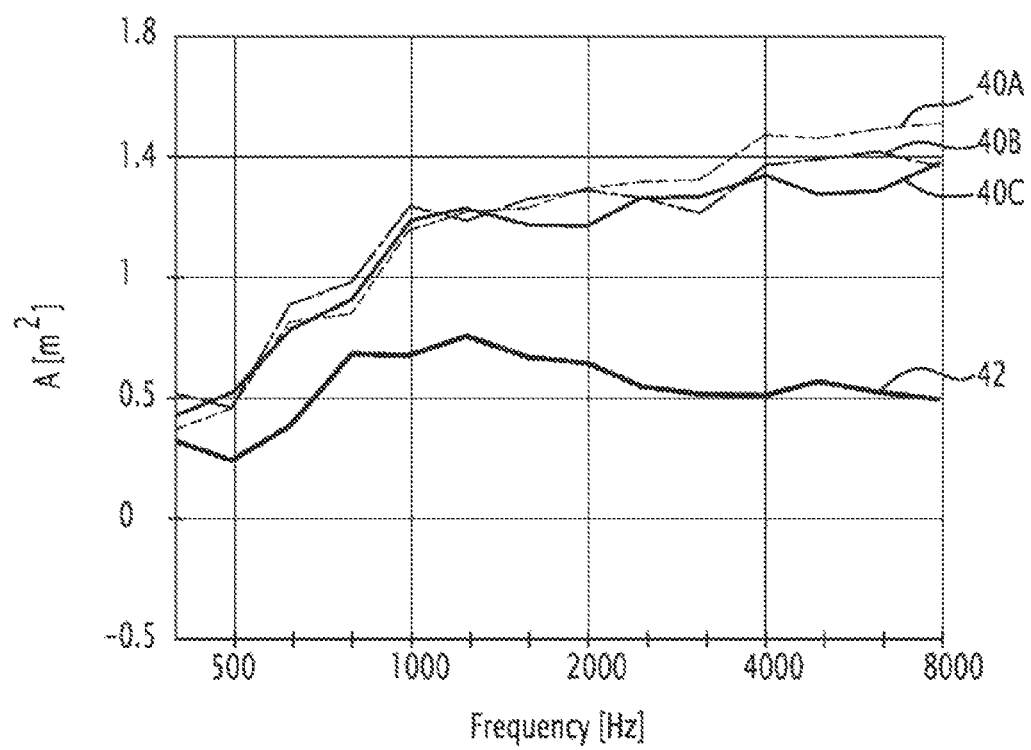
FIG. 3 is a view of the absorption coefficient as a function of the frequency for the component according to the invention, compared with a component of the state of the art.

The absorption behavior of three examples of components 12 according to the invention, shown by the respective curves 40A, 40B, 40C, is illustrated by FIG. 3.

The component 12 corresponding to curve 40A has a first layer 20 with a surface density of 750 g/m² and an upper layer 22 with a surface density of 750 g/m². The component 12 corresponding to curve 40B has an upper layer 22 with a surface density of 1100 g/m² and a layer 20 with a surface density of 750 g/m². The component 12 illustrated by curve 40C has a first layer 20 and a second layer 22 each having a surface density equal to 1100 g/m².

The behavior of a comparable component of the state of the art comprising a rigid polypropylene layer and an absorptive layer is illustrated by curve 42. As can be seen, the absorption of the component 12 according to the invention is significantly superior to that of the state of the art.

Figure 4:
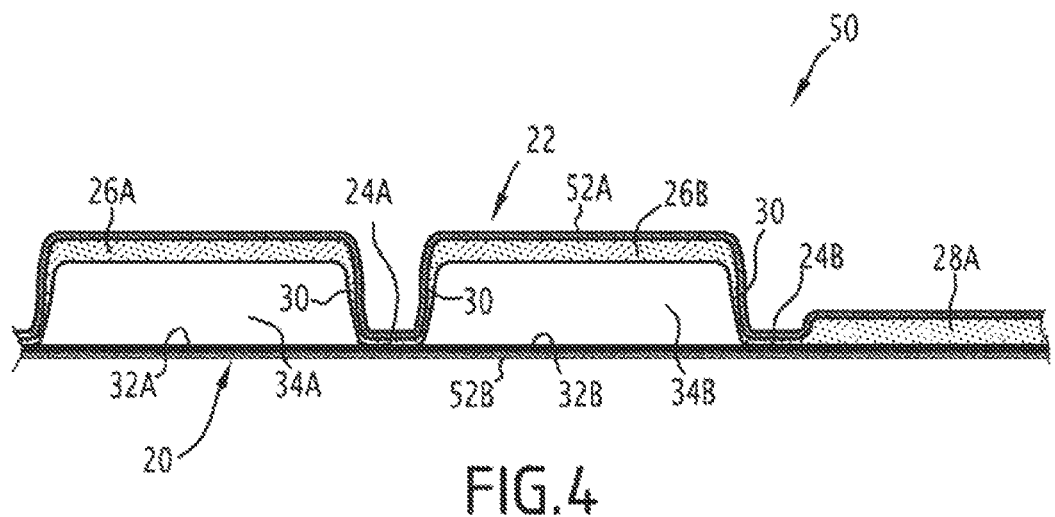
FIG. 4 is a view similar to FIG. 2 of a second component according to the invention.

A second component 50 according to the invention is illustrated by FIG. 4. Unlike the first component 12, the second part 50 further includes at least one resistive porous layer 52A, 52B positioned on one and/or the other of the first support layer 20 and the second layer 22.

In the example shown in FIG. 4, the second component 50 includes a first resistive porous layer 52A positioned on the second layer 22, opposite the first layer 20, and a second resistive porous layer 52B positioned below the first layer 20, opposite the second layer 22.

In this example, each resistive porous layer 52A, 52B cover substantially all of the layer 20, 22 on which it is applied. The resistive porous layer 52A in particular covers the first regions 24A, 24B, the second regions 26A, 26B and the third region 28A, as well as the support regions 30.

Each resistive porous layer 52A, 52B is for example formed with a base of a resistive nonwoven or a material having a controlled air flow resistance (for example, a felt with a low grammage, or textile, preferably calendared).

Each resistive porous layer 52A, 52B advantageously has a surface density comprised between 20 g/m² and 200 g/m². It has an air flow resistance comprised between 200 N·m⁻³·s and 2000 N·m⁻³·s, advantageously comprised between 300 N·m⁻³·s. and 1000 N·m⁻³·s.

Adding a first resistive porous layer 52A makes it possible, in the regions 26A and 26B, to benefit from an improved membrane effect, in particular in the low and medium frequencies, due to a serial addition of resistances to the air passage of the first layer 52A and the regions 26B and 52B. Thus, the membranes formed are very effective in terms of low and medium frequency absorption in a range in particular comprised between 100 Hz and 2000 Hz.

The addition of this same layer 52A on the regions 28A that work not by membrane effect, but by traditional absorption of an open porous material, makes it possible, through a difference in air flow resistance between the layer 52A and the region 28A, to benefit from a gain in absorption, in particular medium and high frequencies. This involves operation as an adjustable bi-permeable absorber. This difference in air flow resistance is advantageously greater than or equal to 250 N·m⁻³·s, the air flow resistance of the layer 52A being greater than that of the region 28A.

Additionally, in light of the small thicknesses obtained in these regions, in particular thicknesses below 7 mm, such an arrangement is particularly suitable for procuring absorption in a high frequency range, in particular exceeding 1000 Hz.

Thus, the second regions 26A, 26B form membranes and the third regions, which are only slightly compressed, cooperate synergistically to provide a wideband absorption.

The resistive layer 52B applied on the first layer 20 is also very effective to withstand impacts, in particular impacts caused by particles or projections, such as stones.

Figure 5:
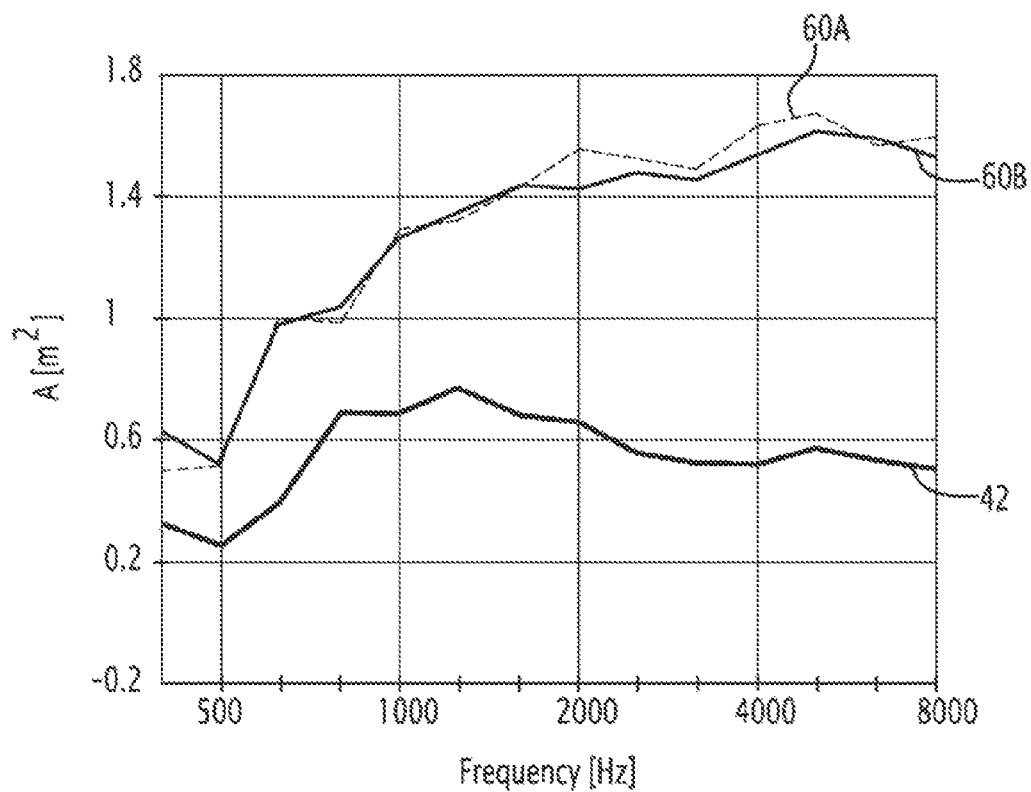
FIG. 5 is a view similar to FIG. 3 of the absorption coefficient as a function of the frequency for the second component.

FIG. 5 illustrates acoustic absorption curves 60A, 60B of several components 50 according to the invention, and curve 42 illustrates the acoustic absorption of a component according to the state of the art.

Curve 60A corresponds to a component 50 having a first layer 20 and a second layer 22 with surface densities equal to 750 g/m². Curve 60B corresponds to a component 50 having a second layer 22 with a surface density of 1100 g/m² and a first layer 20 with a surface density of 750 g/m².

The acoustic absorption procured by the second component 50 according to the invention is therefore further improved relative to the assembly of the state of the art 42, and is also improved relative to that of the first component 12 according to the invention.

Figure 6:
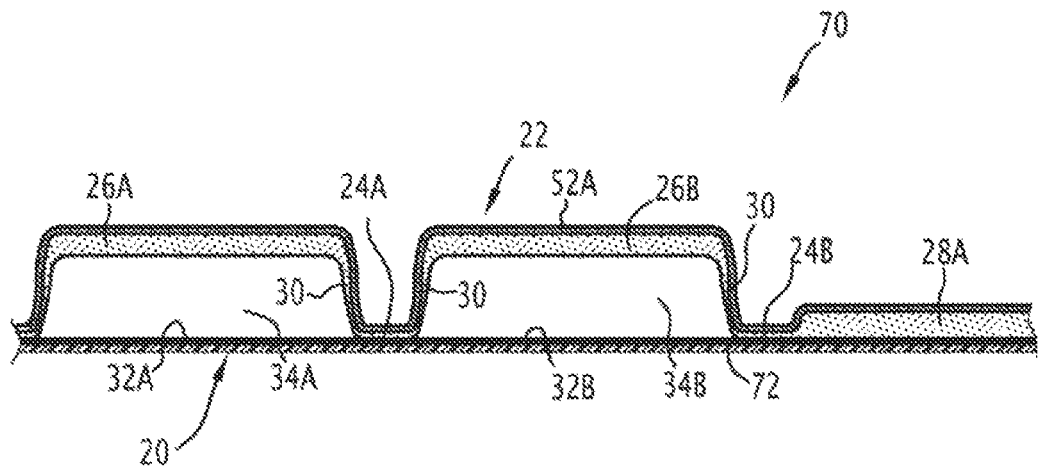
FIG. 6 is a view similar to FIG. 2 of a third component according to the invention.

A third component 70 according to the invention is illustrated in FIG. 6. Unlike the second component 50, the third component 70 includes a resistive layer 52A applied on the second layer 22, and a protective layer 72 applied below the first layer 20, opposite the second layer 22. The protective layer 72 is for example formed by an impermeable layer, in particular a plastic layer such as polypropylene (PP), polyethylene (PE) or polyamide (PA).

The impermeable layer 72 has a small thickness, in particular below 0.5 mm. The layer 72 is for example a film with a surface density below 200 g/m².

In addition to its protective role, the impermeable layer 72 is capable of capturing the mass of the first layer 20 to guarantee acoustic insulation, as described for example in French application No. 11 57500. The components 12, 50, 70 according to the invention are therefore particularly effective in terms of acoustic behavior. They contribute greatly to reducing the noise created in the vehicle, in particular by the engine assembly.

Furthermore, the components 12, 50, 70 according to the invention have light and robust structures. They in particular have an overall mass below 2 kg, which contributes to reducing the consumption of the vehicle and decreasing the emission of greenhouse gases.

A method for manufacturing a component 12, 50, 70 according to the invention will now be described, in light of FIGS. 8 to 10.

The manufacturing method is implemented in a mold 80 including two half-molds 82A, 82B movable relative to one another and delimiting a molding cavity 84 between them. The mold 80 further includes a movable core 86 designed to be inserted into the molding cavity 84 to form the intermediate space 34A, 34B between each second region 26A, 26B and the first layer 20.

When they are closed, the half-mold 82A and the half-mold 82B delimit a molding cavity 84 with a shape substantially complementary to the component 12, 50, 70.

The core 86 includes a planar part 88 and bulges 90 with a shape substantially complementary to the shape of each intermediate space 34A, 34B.

The half-mold 82A has housings with a shape similar to that of each second region 26A, 26B.

Figure 8:
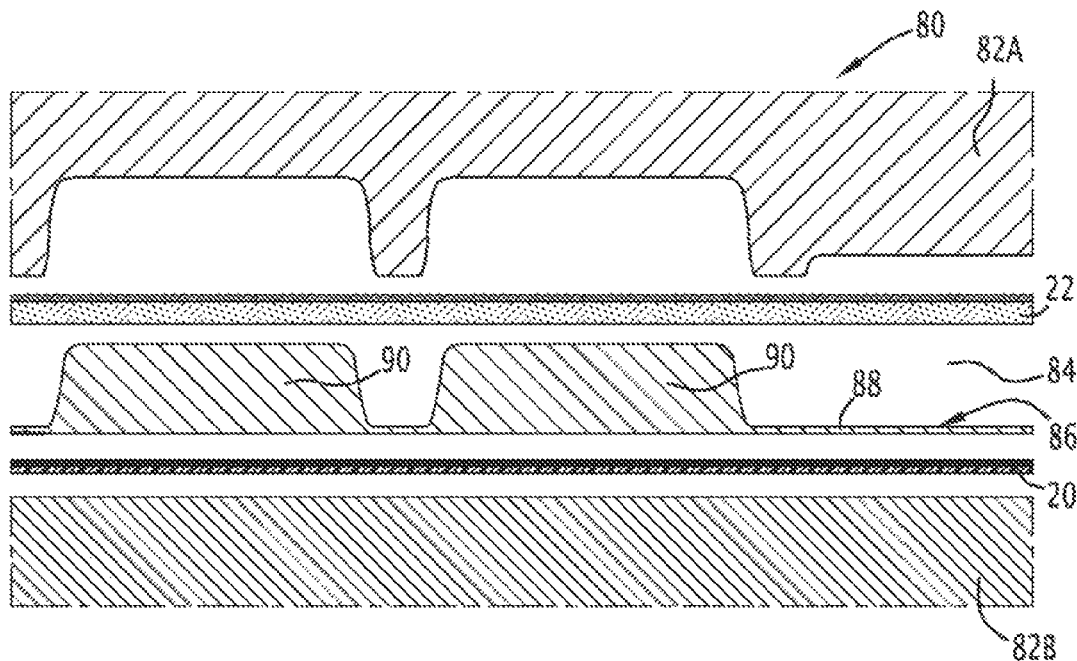
FIGS. 8 to 10 illustrate steps of the method for manufacturing a component according to the invention.

As illustrated by FIG. 8, the method first includes the insertion of a first layer 20 of composite material, then the core 86, and lastly a second layer 22 of composite material, as they are defined above. Next, the mold is heated.

These layers 20, 22 are advantageously made from a felt mixing thermoplastic polymer fibers and composite fibers, such as glass fibers.

The mold 80 is next partially closed by bringing the half-molds 82A, 82B closer together and inserting the first layer 20 between the core 86 and the half-mold 82B, and the second layer 22 between the core 86 and the half-mold 82A.

This causes a compression of the first layer 20 and a selective compression of the second layer 22 in order to form each first region 24A, 24D with a high density, each second hollow region 26A to 26B with a density lower than that of the first region 24A to 24D, and each third region 28A, compressed little or not at all, with a density below the density of the first region 24A, 24D.

In particular, the bulges 90 are inserted into the corresponding cavities formed in the half-mold 82A and offset each second region 26A, 26B relative to the first region 24A to 24D and the adjacent third region 28A.

The heating of the mold 80 causes the thermoplastic fibers to melt.

Figure 10:
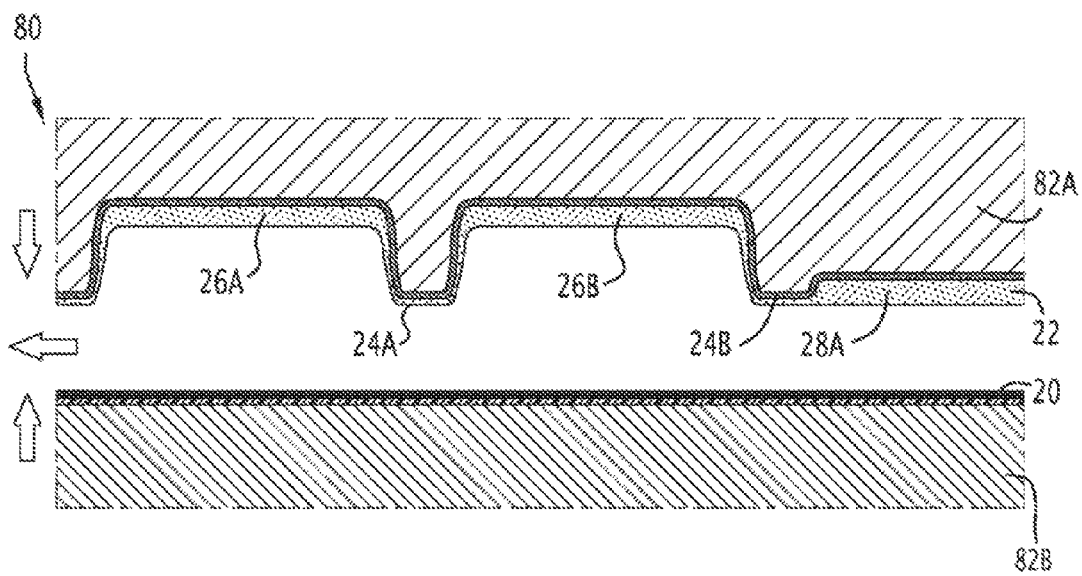

Then, as illustrated by FIG. 10, the mold 80 is once again opened to remove the core 86 from the cavity.

The mold is next cooled to set the thicknesses of the layers 22, 20.

Once the core is removed, the mold 80 is again completely closed, to place each first region 24A, 24B and each third region 28A of the second layer 22 in contact with the first layer 20 by applying a sufficient pressure and temperature to secure the two layers 20, 22.

After a new cooling period, the component 12, 50, 70 thus formed is removed outside the mold 80 and therefore has an intermediate space 34A, 34B across from each second region 26A, 26B. The component 12, 50, 70 also has a compressed first region 24A, 24D, applied on the first layer 20, and at least one third region 28A, compressed little or not at all, applied on the first layer 20.

Figure 9:
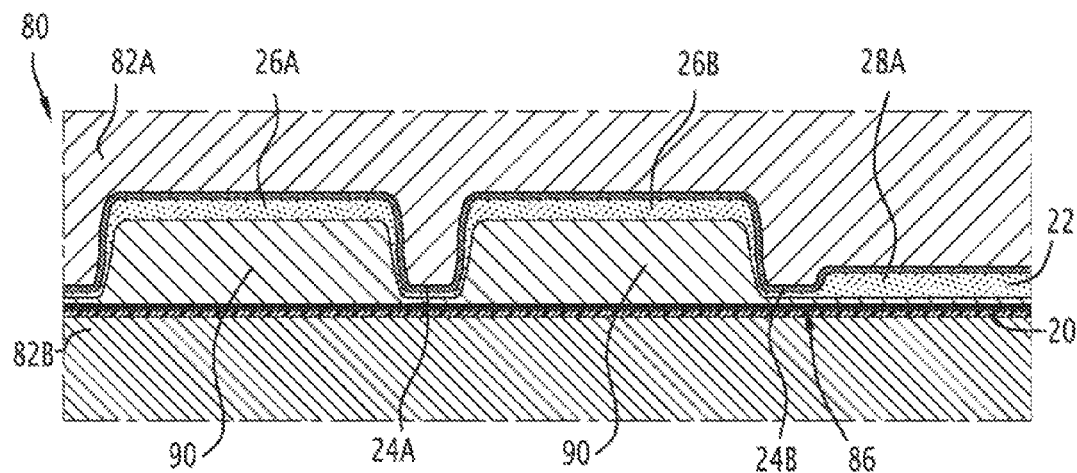

The manufacturing method described in light of FIGS. 8 to 10 is therefore very cost effective, since it only requires one mold 80. This method imparts structural and acoustic features to these components, through a manufacturing method using one extremely cost-effective step.

This is an advantage relative to the methods known from the state of the art, in which a first component is made by injecting plastic, a second component is made by foaming, and the first component and the second component are assembled on one another.

In another alternative (not shown), the component forms a motor vehicle shelf. This shelf is in particular a shelf capable of upwardly closing off a loading space in the trunk of the vehicle and bearing objects. The shelf then includes, in addition to the layers previously described, a decorative layer (for example a textile carpet or other). This decorative layer can have the same air flow resistance features as a resistive nonwoven as described above. In that case, the first layer 20 is positioned above the second layer 22.

The invention claimed is:

1. A component for a motor vehicle, comprising:
a first support layer made from a composite material;
a second layer made from an open porous material, the second layer being partially applied on the first layer, the second layer including at least one first region applied on the first layer and at least one second region positioned across from and separated from the first layer, the second region together with the first layer delimiting an intermediate space at least partially filled with gas;
the second region being connected to the first region by an intermediate region protruding between the first region and the second region, the second region having a density lower than the density of the first region, the second layer comprising at least one third region applied on the first layer, the third region partially protruding away from the first layer, from the at least one first region, the third region having a density lower than the density of the first region and lower than the density of the second region, wherein the density of the second region is comprised between 250 kg/m$^3$ and 300 kg/m$^3$, the density of the third region being comprised between 200 kg/m$^3$ and 250 kg/m$^3$.

2. The component according to claim 1, including at least one resistive porous layer positioned on one of the first layer and the second layer, the air flow resistance from the resistive porous layer being comprised between 200 N·m$^{-3}$·s and 2000 N·m$^{-3}$·s.

3. The component according to claim 2, wherein the air flow resistance of the resistive porous layer is greater than the air flow resistance of the third region.

4. The component according to claim 3, wherein the difference between the air flow resistance of the resistive porous layer and the air flow resistance of the third region is greater than 250 N·m$^{-3}$·s.

5. The component according to claim 1, wherein the second region extends substantially parallel to a zone of the first layer.

6. The component according to claim 1, wherein the composite material of the first layer is formed in a single piece and includes polymer fibers and ceramic fibers.

7. The component according to claim 1, wherein the open porous material of the second layer is in a single piece and is a locally compressed, composite material.

8. The component according to claim 7, wherein the composite material contains polymer fibers and ceramic fibers.

9. The component according to claim 8, wherein the ceramic fibers comprise silica fibers.

10. The component according to claim 1, wherein the surface density of the first layer is comprised between 500 g/m$^2$ and 1500 g/m$^2$.

11. The component according to claim 1, wherein the surface density of the second layer is comprised between 500 g/m$^2$ and 1500 g/m$^2$.

12. The component according to claim 1, wherein the maximum thickness of the intermediate space, between the second region and the first layer, is greater than the thickness of the third region.

13. The component according to claim 1, including a protective sealed layer positioned across from the first layer opposite the second layer.

14. A motor vehicle according to claim 1.

15. A motor vehicle according to claim 14, wherein the component is positioned below an engine of the vehicle to form a protective fairing.

* * * * *